June 2, 1964   M. B. MENTLEY ETAL   3,135,136
INDEXING MECHANISM
Filed Oct. 3, 1960   2 Sheets-Sheet 2
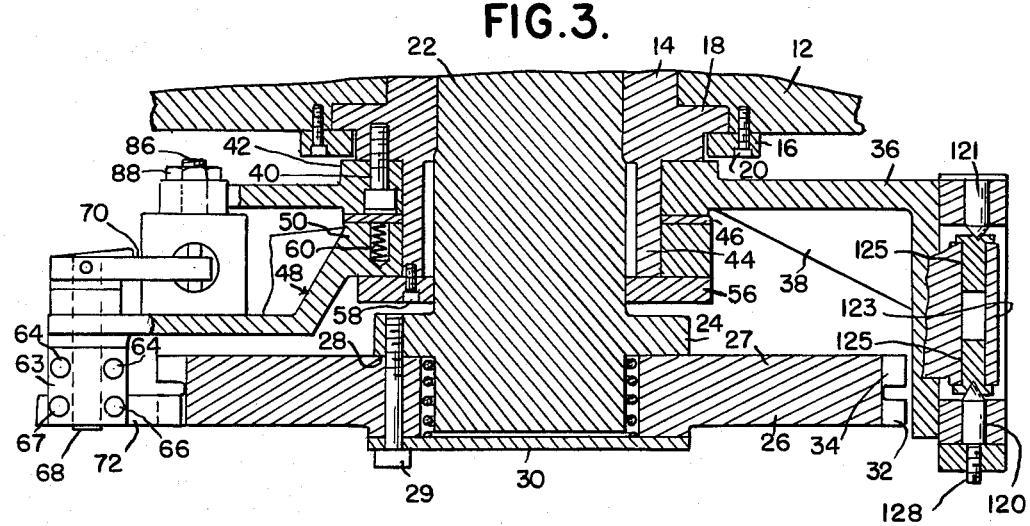
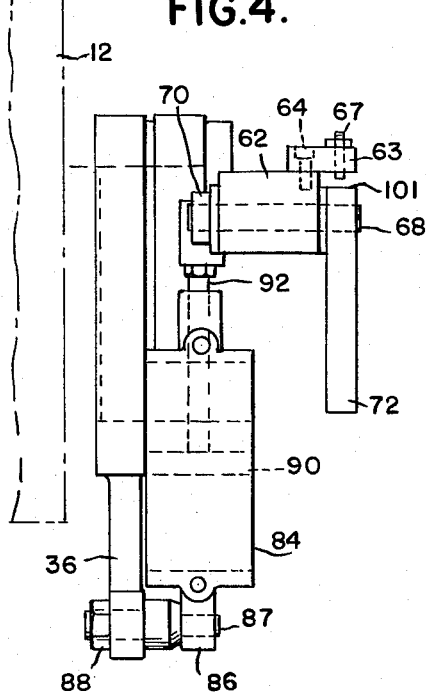
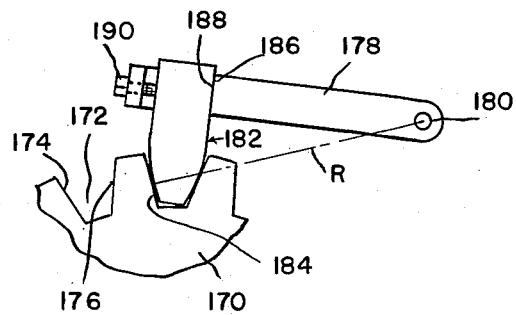
INVENTORS
MAX B. MENTLEY
DAVID W. DANIEL
ZENON KOKORZYCKI
BY
Whitemore, Hulbert
& Belknap ATTORNEYS 3,135,136
INDEXING MECHANISM
Max B. Mentley, David W. Daniel, and Zenon Kokorzycki, all of Detroit, Mich., assignors to National Broach & Machine Company, Detroit, Mich., a corporation of Michigan
Filed Oct. 3, 1960, Ser. No. 59,966
10 Claims. (Cl. 74—822)

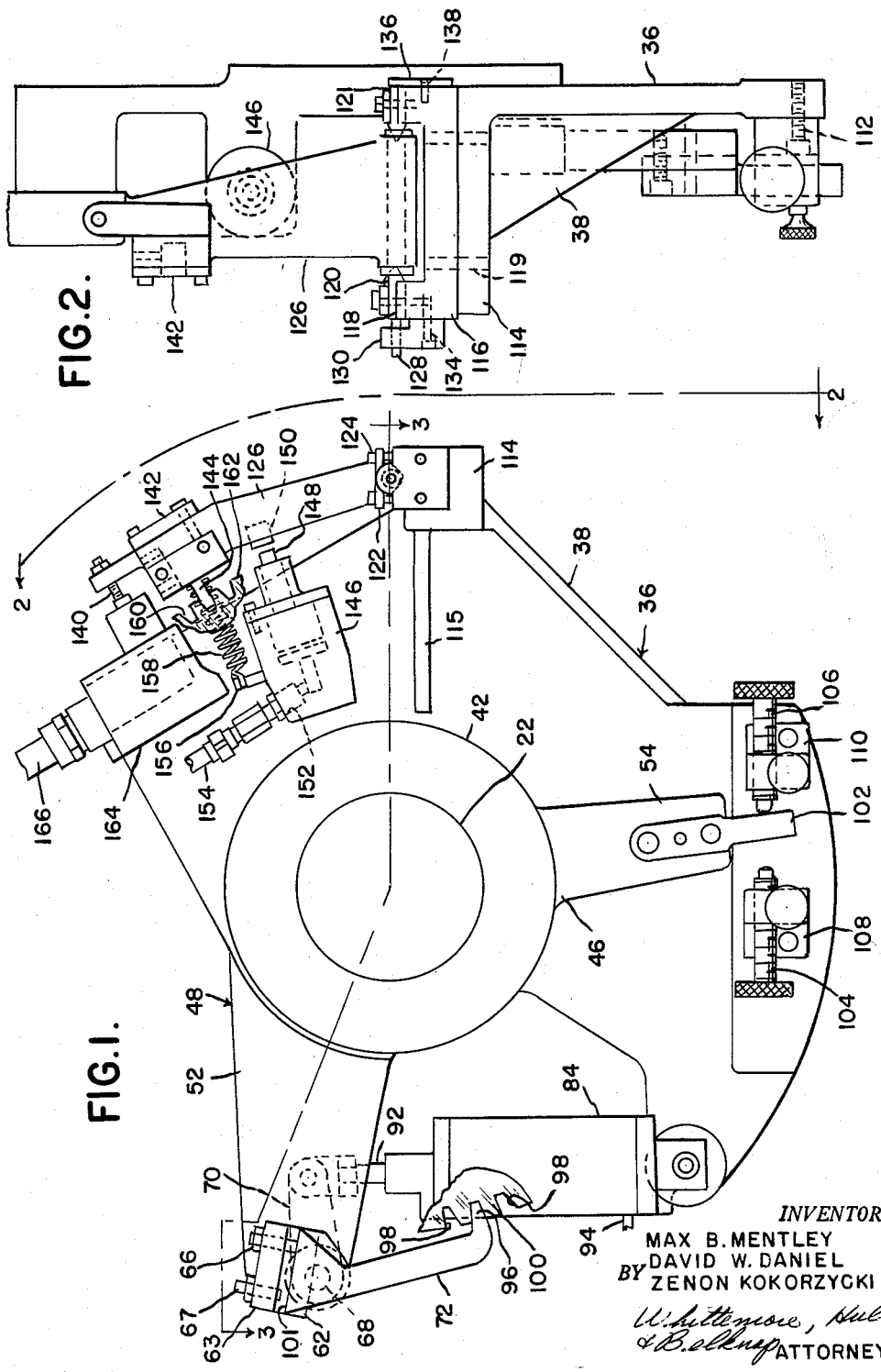

The present invention relates to an indexing mechanism and particularly to a mechanism of the type which is fluid pressure operated.

The invention further relates to improvements in an indexing machine comprising a rotatable indexing table and drive mechanism therefor wherein the table, adapted to carry one or more workpieces, pilots on a central drive hub or shaft and is successively indexed from one work station to another to permit an independently operated work machine to perform a work operation on the workpiece at the index position.

It is therefore an object of the present invention to provide an improved indexing mechanism for machine tools.

Another object of the present invention is to provide a fluid operated ratchet drive for indexing a workpiece carrying table of a machine tool.

A further object of the present invention is to provide a fluid operated ratchet drive for indexing a workpiece carrying table of a machine tool and means for maintaining the table in the index position.

A still further object of the present invention is to provide an indexing mechanism comprising a stationary support, a first member to be indexed rotatably mounted in said support, an index member having a plurality of recesses therein connected to said first member and adapted to impart angular movement thereto, a second member mounted in said stationary support for limited rotation only and a pawl carried by said second member, said second member being effective upon a predetermined signal to urge said pawl into engagement with a recess in said index member and thereafter effect positive rotation of said index member and first member for an amount limited by the rotational movement between said second member and said stationary support.

Another object of the present invention is to provide an indexing mechanism for machine tools which is simple and durable in construction, reliable and positive in operation and which may be economically manufactured.

Other objects of the invention will become apparent as the following description proceeds especially when taken in conjunction with the accompanying drawings, illustrating a preferred embodiment of the invention, wherein:

FIGURE 1 is a top view of the indexing mechanism employed to operate a work table.

FIGURE 2 is an end view looking in the direction of arrows 2—2 in FIGURE 1.

FIGURE 3 is a sectional view taken substantially on line 3—3 of FIGURE 1.

FIGURE 4 is a left hand end view of the structure shown in FIGURE 1.

FIGURE 5 is an enlarged fragmentary view of a novel index plate and locator combination.

The mechanism to be subsequently described is employed in connection with an indexing table of a machine tool. The indexing table is rotatable with reference to the stationary support or frame of the machine tool. The stationary support includes the supporting member 12 located around the sleeve 14. An annular ring 16 engages the lower surfaces of the supporting member 12 and the flange 18 provided on the sleeve 14. Bolts 20 secure the ring 16 to the supporting member 12 and help to prevent the sleeve 14 from rotating.

Rotatably mounted within the sleeve 14 of the stationary support is the rotatable member or shaft 22 to be indexed which is adapted to be connected on the upper end thereof to an indexing table not shown. Spaced from the lower end of the shaft 22 is a flange 24. An index plate or member 26 is suitably connected to the lower end of the shaft 22 so that the upper surface 27 abuts the lower surface 28 of the flange 24 as is shown in FIGURE 3. Bolts 29 extend through end plate 30 and index plate 26 and are received in the flange 24 of the shaft 22. Rotational movement imparted to the index member 26 in turn rotates the shaft 22 and advances the indexing table a predetermined amount.

The index plate or member 26 is circular in cross section and includes a pair of circumferentially toothed sections. One of the sections is the feed section 32 and the other is the locating section 34. Each section has teeth provided on the outer periphery thereof which define recesses therebetween as will be subsequently described.

Also included as part of the stationary support is the platen casting support 36 which has a reinforcing rib or section 38 as is best illustrated in FIGURES 1 and 2. The support 36 is connected to the stationary sleeve 14 by means of bolts 40 and has a hub portion 42 provided with a bore in which the cylindrical extension 44 of the sleeve 44 is located. Beneath the hub portion 42 of the support 36 is a bearing plate 46 which is concentric with the cylindrical extension 44. A pusher member or arm 48 is mounted in the stationary support for limited rotation only. The pusher member 48 has a sleeve portion 50 surrounding the cylindrical extension 44 of the stationary sleeve 14. The pusher member 48 has a pair of substantially radial arms 52 and 54 which are used in a manner to be subsequently described. The arm 54 serves as a stop arm as will be subsequently explained. The pusher member 48 is held on the cylindrical extension 44 by means of a plate 56 which is connected to the extension 44 by means of bolts 58. Springs 60 are interposed in recesses provided in the pusher member 48 and exert a predetermined force against the bearing plate 46. With such an arrangement, the pusher member 48 is permitted to be rotated with reference to the stationary support to provide positive rotation of the index member 26 as will be subsequently described.

In order to effect positive rotation of the index member 26, the pusher arm 52 is provided on the outer end with a pivot housing 62. A bracket 63 is secured to the housing 62 by means of bolts 64. The bracket 63 has a pair of adjustable stop screws 66 and 67 extending therethrough. A pivot pin 68 extends through the housing 62 and has connected thereto on the upper end thereof one end of the lever 70, and on the lower end, the pawl 72 which is in the same plane as the teeth of the feed section 32 provided on the index member 26.

A fluid cylinder 84 is connected to the support 36 by means of a threaded flange 86, stud 87 and nut 88. A piston 90 is movable in cylinder 84 and has connected thereto a rod 92 which extends through one end of the cylinder 84 and is connected to the other end of the lever 70 by means of a suitable connection. When in operation, fluid pressure, such as air, is emitted through the connection 94 provided in the piston end of the cylinder 84 to extend the piston 90 and rod 92 and rotate lever 70 in a counterclockwise direction as viewed in FIGURE 1. This movement rotates shaft 68 and pawl 72 so as to move the tooth 96 of the pawl 72 into the opposite recess 98 provided between the teeth 100 of the feed section 32. When the shoulder 101 provided on the pusher finger or pawl 72 hits the adjustable stop screw 66 as is shown in FIGURE 1, continued movement of the rod 92 in the same direction rotates the pusher member 48 and index member 26 together in a clockwise direction as viewed in FIGURE 1.

In order to advance the index member 26 a predetermined angular increment, a stop member 102 is connected to the stop arm 54. The stop member 102 is located between a pair of adjustable stop abutment screws 104 and 106 which are carried by brackets 108 and 110 respectively. The brackets are suitably connected to the support 36 by means of bolts 112. Rotation of the pusher member 48 in a clockwise direction as previously described will in turn move the stop member 102 against the stop abutment screw 104 to limit the angular rotation of the pusher member 48 and index member 26.

After the index member 26 and the shaft 22 have been advanced, means are provided for maintaining the shaft 22 and index member 26 in the index position while work is being performed on the workpiece located on the indexing table. A bracket 114 is provided on the support 36 and is structurally supported by the web 38 and web 115. The bracket 114 has mounted thereon a pivot frame 116 which includes a pair of upstanding legs 118. Bolts 119 secure frame 116 to the bracket 114. Recesses are provided in the outer ends of the upstanding legs 118 for receiving centering pivots 120 and 121. Each pivot 120 and 121 is located in a leg 118 of the frame 116 by means of a plate 122 and a pair of bolts 124. Interposed between the pivots 120 and 121 is an index finger arm 126 which has an end portion 123 adapted to receive the pivots 120 and 121 as is best illustrated in FIGURE 3. A pair of inserts 125 is located in the end portion 123 of the finger arm 126 and receives the locating end of the pivots 120 and 121. Means are provided for adjusting pivot 120 axially. The pivot 120 has a threaded stem 128 which extends through the end plate 130. Rotation of the stem 128 by means of a screwdriver inserted into a slot provided in the end of the stem will adjust the pivot 120 with respect to pivot 121. End plate 130 is secured to the pivot frame 116 by means of bolts 134. End plate 136 is connected to the other end of the frame by bolts 138.

The other end of the index finger arm 126 carries an adjustable limit switch actuator 140. Intermediate the ends of the finger arm 126 is an adapter 142 which has a locator 144 extending therefrom. The adapter 142 is appropriately connected to the finger arm 126.

Mounted on the support 36 is a fluid actuated cylinder 146 which has a plunger 148 movable therein. One end of the plunger 148 extends through an end wall of the cylinder 146, opposite the finger arm 126, and is adapted to engage the plunger insert 150 provided on the finger arm 126. A fluid connection 152 is provided in the cylinder 146 and is adapted to be connected to a suitable source of actuating fluid, as an example, air, by means of the connector 154.

An abutment pin 156 is connected to the cylinder 146. A spring 158 has one end connected to the abutment pin 156 and the other end connected to the finger arm 126 to provide a biasing force for urging the locator 144 into the recess 160 provided between the teeth 162 of the locating section 34.

A limit switch 164 is fixed to the support 36 opposite the actuator 140 provided on the finger arm 126. The limit switch 164 is connected to a suitable source of electrical energy by means of conduit 166.

Initially, when the indexing table is to be indexed, the pusher finger or pawl 72 is out of engagement with the feeding section 32. Prior to the initiation of the indexing cycle, fluid is applied to the cylinder 146 to urge the plunger 148 against the plunger insert 150, thereby moving the finger arm 126 in an outwardly direction against the spring 158. This results in the removal of the locator 144 from the recess 160 of the locating section 34. After this operation is completed, fluid is admitted during the indexing cycle to the piston end of the cylinder 84. The piston 90 and rod 92 are extended so as to rotate the lever 70 in a counterclockwise direction as viewed in FIGURE 1. This movement in turn rotates the pin 68 and pawl 72 in the same direction so that the tooth 96 on the pawl 72 is moved in the opposite recess 98 provided in the index member 26. When the shoulder 101 provided on the pawl 72 engages the adjustable stop screw 66, continued movement of the piston and rod 92 in the same direction is effective to rotate the pusher member 48, index member 26 and shaft 22 in a clockwise direction as viewed in FIGURE 1. This rotation or indexing is limited by the engagement of the stop member 102 with the adjustable abutment screw 104.

After the table has been advanced to the desired index position, the fluid pressure is removed from the cylinder 146, thereby permitting the spring 158 to bias the finger arm 126 in a direction to position the locator 144 in the opposite recess 160. At this time, the index member 26 and shaft 22 are maintained in the index position. As the finger 144 seats fully into the adjacent recess, the actuator 140 engages and actuates the safety limit switch 164, releasing the machine for further operation. After switch 164 is actuated, the fluid connection to the cylinder 84 is reversed and the piston 90 and rod 92 are moved in the opposite direction into the cylinder 84. This in turn moves the tooth 96 of the pawl 72 out of the recess 98 and rotates lever 70, pin 68 and pawl 72 in a clockwise direction as viewed in FIGURE 1 until the shoulder 101 engages the adjustable stop screw 67. Continued movement of the piston 90 in the same direction results in the pusher member 48 being rotated in a counterclockwise direction as viewed in FIGURE 1 and returned to its original position with the stop member 102 in engagement with the adjustable abutment screw 106.

The limit switch 164 provides a safety factor in the machine and also serves as means for stopping the clutch provided on the machine.

In FIGURE 5 there is shown a novel index plate and locator combination which may be used in the mechanism shown but which is capable of use in any index operation.

Index plate 170 has a plurality of locating recesses 172 each of which has a locating side 174 and an actuating or camming side 176. Locating sides 174 are circumferentially spaced at the exact desired index interval. These surfaces are preferably plane or flat, and may be radial of the index plate or inclined as shown.

Lever arm 178 has a pivot mounting at 180 and carries an index finger 182 having a locator surface 184 which is cylindrical and has its center of curvature at the pivot axis of arm 178, provided by pivot mounting 180. Therefore, surface 184 of finger 182 has line contact with surface 174 of the recesses 172, and provides exact location irrespective of the width of the recesses. Obviously, if a recess is wider than shown, the finger merely moves in to a greater depth, but since the locator surface is cylindrical and has a radius R centered at 180, this does not affect location.

It is essential that pivot mounting 180 be located along a line drawn from a point located between the radially inner and outer edges of surface 174 and perpendicular thereto at a distance equal to radius R of the locating finger.

As seen in FIGURE 5, finger 182 is removably mounted on arm 178. Its surface 186 locates against surface 188, and these surfaces are preferably cylindrical, centered also at 180. In order to provide for contact with the surface 174 at different points, fingers 182 of different radial spacing between surfaces 184 and 186 are provided, and are retained in place by set screws 190. This in effect varies the length of radius R.

The fingers 182 are preferably made by forming circular rings having an internal radius equal to the spacing between pivot 108 and surface 188 and an external radius to give the required width. A plurality of fingers are then cut from the ring.

The drawings and the foregoing specification constitute a description of the improved indexing mechanism in such full, clear, concise and exact terms as to enable any person skilled in the art to practice the invention, the scope of which is indicated by the appended claims.

What we claim as our invention is:

1. A support, a shaft rotatably mounted on said support, an index member fixed to said shaft, said index member comprising a notched index section and a notched drive section, a pusher member mounted on said support for movement about the axis of said shaft, said pusher member including a pusher arm and a stop arm, a stop abutment on said support on each side of said stop arm to limit movement of said pusher arm, a lever pivoted to the end of said pusher arm, a pawl on said lever engageable with the notches on said drive section, power means on said support connected to said lever to swing said lever in the direction required to engage the pawl thereon in a notch of said drive section and effective thereafter to rotate said pusher member and index member as a unit in an amount limited by the engagement between said stop arm and one of said stop abutments, and operable when reversed to withdraw said pawl and thereafter return said pusher member to its initial position as determined by the engagement between said stop arm and the other stop abutment, an index finger arm pivotally connected on one end to said support, and a locator carried by said finger arm, said finger arm being arranged so as to move said locator into and out of selected ones of the notches in said index section.

2. A support, a shaft rotatably mounted on said support, an index member fixed to said shaft, said index member comprising a notched index section and a notched drive section, a pusher member mounted on said support for movement about the axis of said shaft, said pusher member including a pusher arm and a stop arm, a stop abutment on said support on each side of said stop arm to limit movement of said pusher arm, a lever pivoted to the end of said pusher arm, a pawl on said lever engageable with the notches on said drive section, power means on said support connected to said lever to swing said lever in the direction required to engage the pawl thereon in a notch of said drive section and effective thereafter to rotate said pusher member and index member as a unit in an amount limited by the engagement between said stop arm and one of said stop abutments, and operable when reversed to withdraw said pawl and thereafter return said pusher member to its initial position as determined by the engagement between said stop arm and the other stop abutment, an index finger arm pivotally connected on one end to said support, a locator carried by said finger arm, said finger arm being arranged so as to move said locator into and out of selected ones of the notches in said index section, and resilient means for biasing said locator into engagement with the opposite notch in said index section.

3. The structure defined in claim 1 wherein power means are provided on said support for urging said finger arm in a direction to remove said locator from said index section prior to the indexing operation.

4. The structure defined in claim 1 wherein said stop abutments are adjustable.

5. An index mechanism comprising a support, a shaft rotatably mounted on said support, an index member fixed to said shaft, said index member comprising a notched index section and a notched drive section, a pusher member mounted on said support for movement about the axis of said shaft, said pusher member including a pusher arm and a stop arm, a stop abutment on said support on each side of said stop arm to limit movement of said pusher arm, a pin extending through said pusher arm, a lever mounted on one end of said pin, a pawl mounted on the other end of said pin and engageable with the notches on said drive section, power means on said support connected to said lever to rotate said lever and said pin in the direction required to rotate the pawl into engagement with a notch of said drive section and effective thereafter to rotate said pusher member and index member as a unit in an amount limited by the engagement between said stop arm and one of said stop abutments, and operable when reversed to withdraw said pawl from said drive section and thereafter return said pusher member to its initial position as determined by the engagement between said stop arm and the other stop abutment, an index finger arm pivotally carried by said support, and a locator carried by said finger arm, said finger arm being arranged so as to move said locator into and out of selected ones of the notches in said index section.

6. The mechanism defined in claim 5 wherein power means are provided on said support for urging said finger arm in a direction to remove said locator from said index section prior to the indexing operation.

7. The mechanism defined in claim 5 wherein said stop abutments are adjustable.

8. The mechanism defined in claim 5 wherein resilient means are provided for biasing said locator into engagement with the opposite notch in said index section.

9. An index mechanism comprising a support, a shaft rotatably mounted on said support, an index member fixed to said shaft, said index member comprising a notched index section and a notched drive section, a pusher member mounted on said support for rotary movement about the axis of said shaft, a pair of stop abutments on said support for limiting the rotary movement of said pusher member in opposite directions, a pin extending through said pusher member, a lever mounted on one end of said pin, a pawl mounted on the other end of said pin and engageable with the notches on said drive section, power means on said support connected to said lever to rotate said lever and said pin in the direction required to rotate the pawl into engagement with a notch of said drive section and effective thereafter to rotate said pusher member and index member as a unit in an amount limited by the engagement between said pusher member and one of said stop abutments, and operable when reversed to withdraw said pawl from said drive section and thereafter return said pusher member to its initial position as determined by the engagement between said pusher member and the other of said stop abutments, an index finger arm pivotally connected to said support, and a locator carried by said finger arm, said finger arm being arranged so as to move said locator into and out of selected ones of the notches in said index section.

10. Index mechanism comprising a circular index plate having a plurality of peripheral recesses, each of said recesses having at opposite sides thereof locating and actuating surfaces converging inwardly of said plate, the locating surfaces of said recesses being provided at substantially exact uniform circumferential spacing, pivot means mounting said plate for index rotation about a central pivot axis, an index arm, fixed pivot means mounting said arm for swinging movement toward and away from the periphery of said plate, the pivot means at said arm having a pivot axis parallel to the central pivot axis of said plate, said index arm having a pawl at the end remote from its pivot mounting, said pawl having at opposite sides thereof locating the actuating surfaces converging toward said plate, the actuating surfaces of said pawl and recesses being engageable to effect rotation of said plate upon movement of said pawl into one of said recesses, the locating surface of said pawl being cylindrically formed with its axis of curvature coincident with the axis of the pivot means mounting said arm for swinging movement and hence capable of locating said plate upon engagement with the locating surface of each of said recesses in substantially exact indexed positions irrespective of variations in width of said notches.

References Cited in the file of this patent

UNITED STATES PATENTS

| | | |
|---|---|---|
| 2,660,895 | Waters | Dec. 1, 1953 |
| 2,848,909 | Hill | Aug. 26, 1958 |
| 2,905,029 | Gustafson | Sept. 22, 1959 |
| 2,938,606 | Passman | May 31, 1960 |
| 2,947,317 | Towler | Aug. 2, 1960 |
| 2,956,452 | Dever | Oct. 18, 1960 |